Figure 1A:
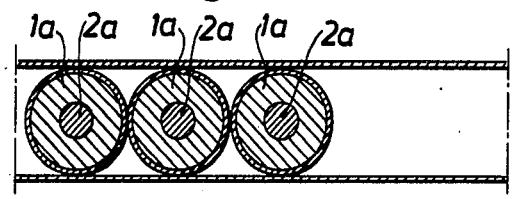

United States Patent [19]

Lindholm et al.

[11] 4,374,908

[45] Feb. 22, 1983

[54] TUBULAR ELECTRODE

[76] Inventors: Alfons S. M. Lindholm, Herserudsvagen 2C, S-181 34 Lidingo; Rolf C. G. Magnusson, Matrosvagen 5, S-133 00 Salsjobaden, both of Sweden

[21] Appl. No.: 206,607
[22] PCT Filed: Jan. 30, 1980
[86] PCT No.: PCT/SE80/00029
§ 371 Date: Sep. 30, 1980
§ 102(e) Date: Sep. 26, 1980
[87] PCT Pub. No.: WO80/01626
PCT Pub. Date: Aug. 7, 1980

[30] Foreign Application Priority Data

Jan. 30, 1979 [SE] Sweden .............................. 7900812

[51] Int. Cl.$^3$ ............................................. H01M 2/18
[52] U.S. Cl. ................................. 429/140; 429/143
[58] Field of Search ............... 429/140, 141, 225–228, 429/143

[56] References Cited

U.S. PATENT DOCUMENTS

| 1,479,527 | 1/1924 | Wilson | 429/140 |
| 4,276,359 | 6/1981 | Sundberg | 429/140 |
| 4,279,974 | 7/1981 | Nishio | 429/140 X |

Primary Examiner—Charles F. LeFevour
Attorney, Agent, or Firm—Townsend and Townsend

[57] ABSTRACT

The invention relates to a tubular electrode for an electrochemical accumulator in the shape of an electrode plate with a number of electrolyte-permeable tube casings essentially parallelly arranged adjacent each other, containing an active material and conductors connected to a common collecting bar.

10 Claims, 5 Drawing Figures

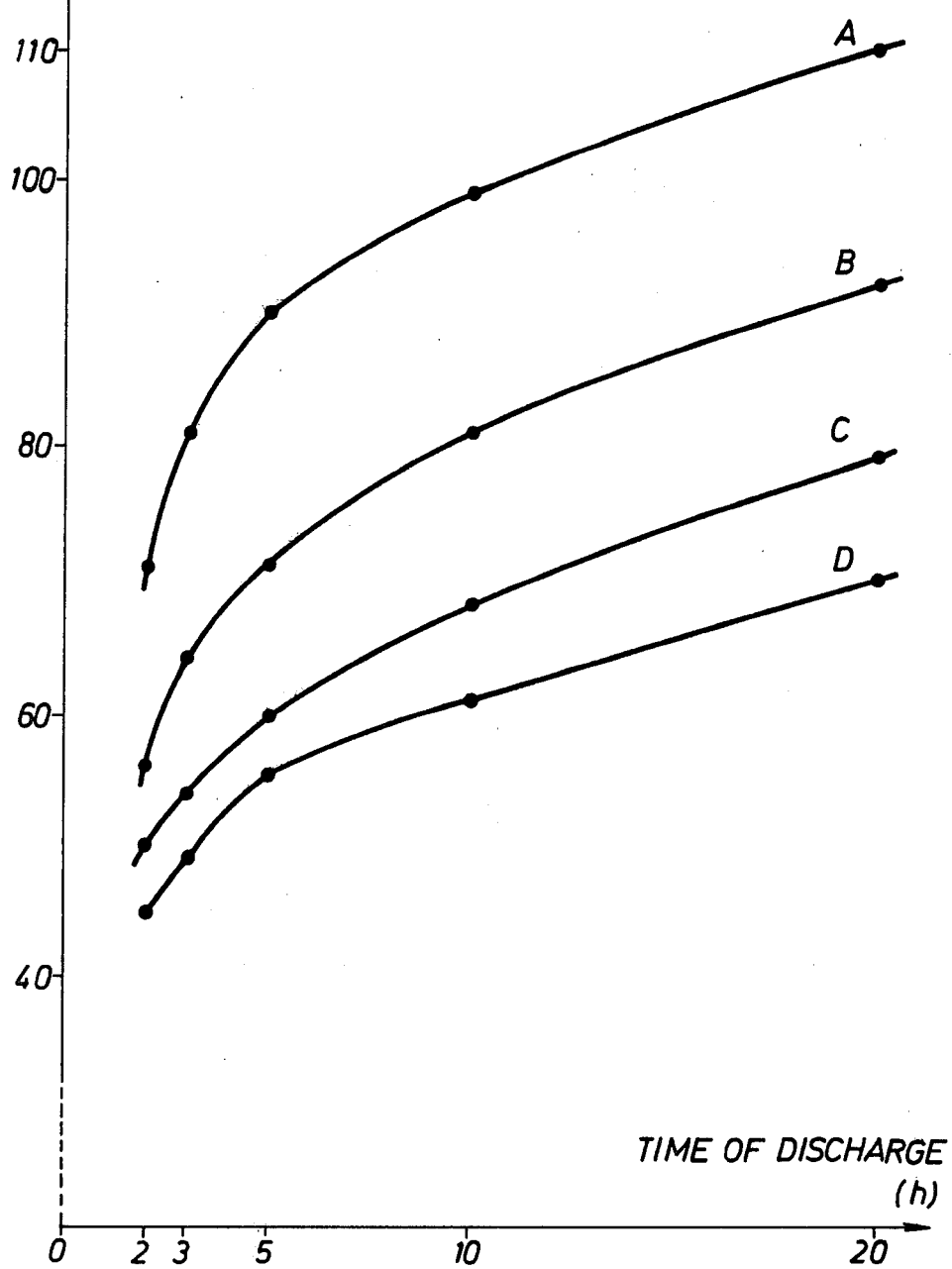

TUBULAR ELECTRODE

The invention relates to a tubular electrode for an electrochemical accumulator in the shape of an electrode plate with a number of electrolyte-permeable tube casings essentially parallelly arranged adjacent each other, containing an active material and conductors connected to a common collecting bar.

The demand for an improved capacity in conventional electrochemical current sources have increased considerably over the last years. An important task has been to replace petrol-powered vehicles with electrically powered ones to the greatest possible extent, whereby different details in lead batteries have been modified. However, the geometrical conditions as a development object have only been studied to a lesser extent. This concerns in particular the nowadays well documented tubular electrode constructions.

In these tubular electrode constructions the tube casings are normally provided with a circular or a rectangular and in certain cases a sqaure cross section. A circular cross section renders a comparatively large surface exposed to the electrolyte as the adjacent tubes merely contact each other along a line. This permits a good electrolyte flow and furthermore the disposal of generated heat. Hereby rather extensive current outputs are made possible which is a necessity in most batteries for tractionary or stationary use. On the other hand, tube casings with a circular cross section result in a relatively low output of energy per unit of weight, which is a disadvantage especially in a continuous average current load and accelerating use of energy. A method to increase the possible output of energy per unit of weight is to decrease the diameter of the tube casing, e.g. from 8–9 mm to 6–7 mm, though the material costs will simultaneously rise considerably.

Another method of increasing the possible output of energy per unit of weight is to provide the tube casings with rectangular, possibly square cross sections, and to pack the casings quite densely with the sides adjacent each other. Although a certain increase of the electron conductivity is hereby achieved, the maximum output, however, becomes relatively low due to an inferior electrolyte diffusion and convection as well as a consequent risk for overheating.

In the literature also other arrangements have been proposed, as triangular, rhombic and polygonal shapes of cross sections in the tube casings, but these solutions have proven less suitable in cells working in practice, among others as a consequence of considerable transport passages for the electrolyte as well as deformation risks.

The object of the invention is to achieve an improved tubular electrode for an accumulator of the kind stated in the preamble, especially a lead accumulator, whereby the above mentioned disadvantages are eliminated and an improved performance is obtained. A higher energy density (Wh/kg) is hereby especially strived for, this higher energy density being required for the driving of an electrically powered vehicle. Further objects are to achieve an accumulator permitting a good electrolyte flow, high outputs, a maintained high capacity even after several charging cycles, as well as a lower weight per unit of volume.

These and other objects are obtained through a tubular electrode according to the invention, the tube casings of which have an elongated, preferably almost elliptical cross section and are inclined so that the plane through the major axis of the cross sections forms an angle between 25° and 50° to the central plane of the plate and each pair of the adjacent tube casings contact each other along a line.

Figure 1B:
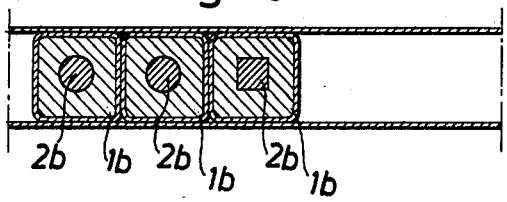
Figure 2:
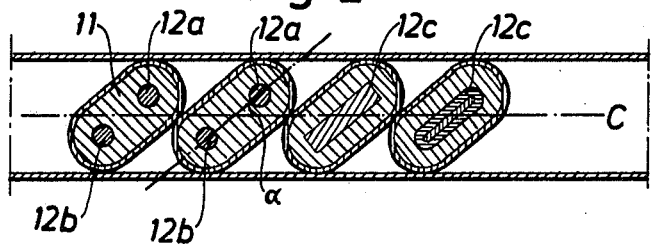
Figure 3:
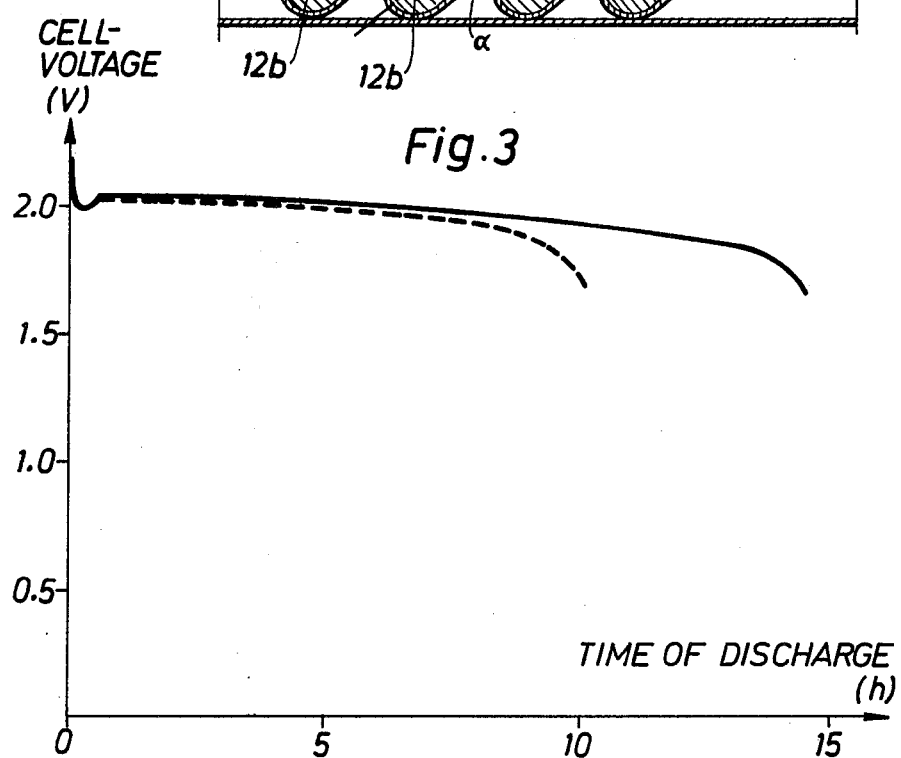
Figure 4A:
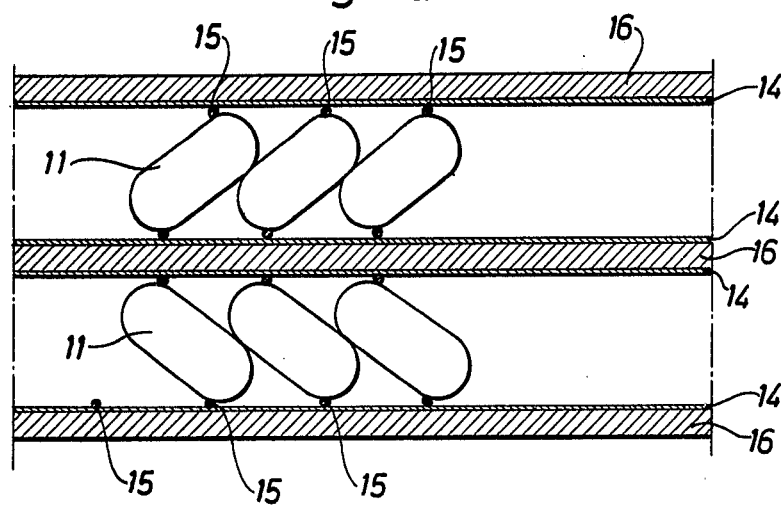
Figure 4B:
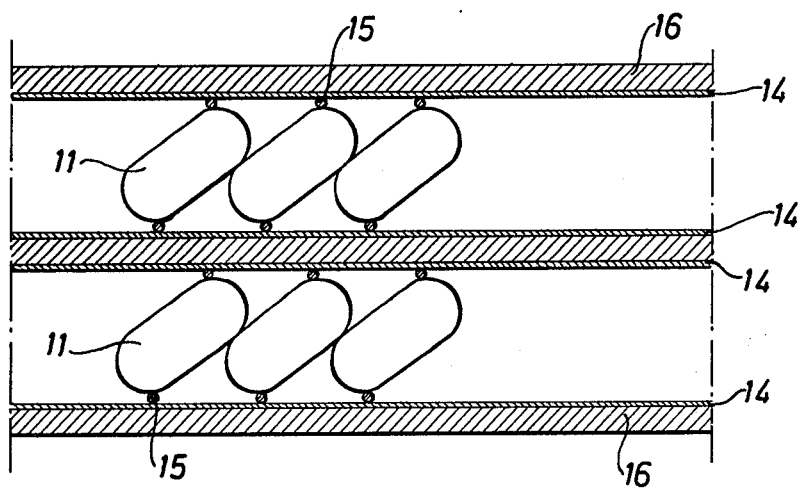

The invention will be described further by means of a lead accumulator and with reference to the attached drawing where FIGS. 1a and 1b schematically illustrate two conventional tubular electrode configurations in cross section;

FIG. 2 schematically illustrates a tubular electrode configuration in accordance with the invention;

FIG. 3 illustrates a diagram showing a comparison in discharge processes between an ordinary tubular electrode configuration and a configuration according to the invention;

FIGS. 4a and 4b schematically illustrate two possible arrangements of the tube casings in adjacent tubular plates according to the invention; and FIG. 5 illustrates a comparison between the specific capacity of a tubular electrode configuration according to the invention and an ordinary one.

Thus, FIGS. 1a and 1b illustrate schematically conventional embodiments of tube casings 1a and 1b, respectively, in positive electrodes in the shape of so called tubular plates, i.e. a number of electrolyte-permeable tube casings parallelly arranged adjacent each other, which tube casings contain an active material (usually lead powder, i.e. essentially a mixture of lead and lead oxide powder) and conductors 2a and 2b, respectively, connected to a common collecting bar. In FIG. 1a the tube casings are provided with a circular cross section and contact each other only along a line, while the tube casings 1b in FIG. 1b are substantially square and are packed densely with the sides contacting each other. The advantages and disadvantages of these known configurations have been discussed above.

Instead and according to the invention a rather simple but, as it has proven, particularly advantageous tube casing configuration in accordance with FIG. 2 is proposed. Hereby the tube casings 11 are provided with an elongated, almost elliptical cross section and are arranged adjacent each other and inclined at an angle $\alpha$ to the central plane C of the tubular plate. The angle $\alpha$ is preferably about 35° to 40°, but also greater and smaller angles within the interval 25° to 50° render a clearly improved function in comparison with the conventional arrangements. This function could be explained partly by the elongated cross section, partly by the inclination and partly by the tube casings contacting each other along a line (as the known circularly cylindrical tube casings). Hereby a strong electrolyte convection and a fresh supply of electrolyte from the environment is attained, which among other things prevent a strong heat generation and makes possible a relatively long discharge time. At the same time advantageous short transport passages within and outside the tube casing are obtained through the fact that each tube casing contains two conductors 12a and 12b, respectively, placed near to the end portions of the elongated cross section, e.g. near to the foci of the ellipse, or, alternatively, one single elongated conductor 12c, possibly containing a core of a highly conductive metal being copper or aluminium. In comparison with the circularly cylindrical tube casings the arrangement according to the invention furthermore results in a substantially higher available amount of energy per cell unit, which fact is of a particularly great importance for use of the cells in electrically powered vehicles. The improved capacity of the accumulator is illustrated in FIG. 3 showing the voltage variation when discharging for about 10 h, firstly, in a cell according to the invention (continuous line) and, secondly, in a conventional cell with circularly cylindrical tube casings (dotted line). As is shown the inclined tubular electrodes result in a surplus of available amount of about 20-30%. The tube casings are produced from an inert material, e.g. in the shape of a woven sock of glass fibre with a perforated outer housing of plastic serving as a reinforcement. Furthermore, non-woven materials, single-walled glass fibre socks reinforced with synthetic resin or any other suitable material can be used, ensuring a good permeability for liquid and gas, a low electric resistance as well as a mechanical resistance to wearing and bursting. The production is rather uncomplicated and can be made with methods known within the battery technique. This is also the case with the electron conductors in the tube casings and their connection to a common collecting bar, which parts can be molded correspondingly to conventional lead grids. Hereby thin electron conductors can be produced from lead, antimony lead, calcium lead or the like. In accumulator cells for electrically powered vehicles or the like where high current outpurts are required, the conductors should be made thicker, e.g. by electrolytical deposition of lead or lead alloys on the grids. At the same time a suitable metal doping can hereby be obtained.

In FIGS. 4a and 4b, respectively, the tube casing arrangement according to the invention is schematically shown in adjacent accumulator cells in a battery. The elongated, oval, inclined tubes 11 in each respective row, thus, form positive electrodes, which by means of thin separators 14 and spacer ribs 15 (e.g. of polyethylene or polystyrene) extending along the tubes are kept apart from be intermediate, negative electrode plates 16. Due to the specific spacer ribs 15 the separators can be made very thin, which favours the electrolyte diffusion and the ionic migration.

The arrangement according to FIG. 4a with the tubes 11 inclined in different directions in adjacent cells results in a very good electrolyte convection around the tubes but simultaneously in an increased point load on the negative electrode 16 right between the contact points of the elliptical tube casings 11 to the spacer ribs 15. The arrangement according to FIG. 4b on the other hand results in a more even load on the negative electrode 16 and should thus be used when a maximum utilization of the negative electrode material is a demand. Of course, it is also possible to combine the arrangements according to FIGS. 4a and 4b in one and the same battery.

FIG. 5 shows the relations in available amount of current per unit of weight of positive, active material between electrodes with ordinary, circular tube casings (C,D) and electrodes with elongated, oval tube casings according to the invention (A,B). As an active material partly a pulverous lead powder (B,D) and partly a lead-powder (A,C) granulated with polyvinyl alcohol have been used. Hereby the improvement obtained through the geometry according to the invention is apparent.

In the production of the tubular electrodes the filling of the tube casings with a pulverous lead powder is connected with considerable working environmental problems, primarily due to raising of dust. Thus, it is particularly suitable to use a granular material with a grain-size of between 40 $\mu$m and 500 $\mu$m as an active material. Microporous granules containing a binder, preferably a polyvinyl alcohol, in an amount of 0.5-2.0% per weight, preferably 0.8-1.5% per weight, ensuring that the granules do not deteriorate during handling, have proven to give a good result. Apart from an improved manageability and decreased working environment risks the granules render a more even degree of filling, a tidy structure and a more open pore system in the active electrode material, contributing to further improve the capacity of the accumulator cells according to the invention.

The invention can be applied by a person skilled in the art in several ways within the scope of the inventive idea as it is presented in the following claims. For example, it is plausible to utilize the invention for accumulator cells with electrodes of nickel or cadmium instead of lead.

We claim:

1. A battery electrode structure comprising:
   a generally planar first electrode;
   a plurality of elongate, permeable tube casings each having a generally oval cross-sectional shape, arranged parallel to one another at an angle to the first electrode of between about 25° and 50°, and touching one another along longitudinal contact lines, said angle measured from the major axis of the cross-section of said tube casing;
   a second electrode arranged within each said tube casing; and
   an active material substantially filling a volume within said tube casings between said second electrodes and an internal surface of said respective tube casings.

2. The electrode structure of claim 1 wherein said tube casings and said second electrode and active material therewith are sandwiched between a pair of parallel first electrodes.

3. The electrode structure of claim 1 further comprising permeable separator means between said first electrode and said tube casings.

4. The electrode structure of claim 1 further comprising spacer rib mounting means for offset mounting of said tube casings from said first electrode.

5. The electrode structure of claim 1 wherein said second electrode has an elongate cross-sectional shape aligned with said major axis.

6. The electrode structure of claim 5 wherein the distance between the outside surface of said second electrode and the inside surface of the surrounding tube casing is generally constant.

7. The electrode structure of claim 1 comprising a plurality of second electrodes arranged along said major axis.

8. The electrode structure of claim 1 wherein said generally oval cross-sectional shaped tube casing has parallel lateral sides and semi-circular ends.

9. The electrode structure of claim 1 wherein said tube casing and second electrode have congruent cross-sectional shapes.

10. The electrode structure of claim 1 wherein said angle is between about 35° and 40°.

* * * * *